US 8,278,378 B2

(12) United States Patent
Jung et al.

(10) Patent No.: US 8,278,378 B2
(45) Date of Patent: Oct. 2, 2012

(54) ORGANOSILICATE COMPOUND, AND COMPOSITION AND FILM INCLUDING THE SAME

(75) Inventors: Young-Suk Jung, Suwon-si (KR); Sang-Mo Kim, Hwaseong-si (KR); Byung-Hee Sohn, Yongin-si (KR); Yoo-Seong Yang, Yongin-si (KR); Eun-Seog Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/939,789

(22) Filed: Nov. 4, 2010

(65) Prior Publication Data
US 2011/0105663 A1 May 5, 2011

(30) Foreign Application Priority Data

Nov. 4, 2009 (KR) ........................ 10-2009-0106217

(51) Int. Cl.
*C08K 5/5419* (2006.01)
*C07F 7/18* (2006.01)

(52) U.S. Cl. ....................................... 524/267; 556/413

(58) Field of Classification Search ........................ None
See application file for complete search history.

(56) References Cited

U.S. PATENT DOCUMENTS

| | | | | |
|---|---|---|---|---|
| 4,689,085 A | * | 8/1987 | Plueddemann | 106/287.14 |
| 5,750,197 A | * | 5/1998 | van Ooij et al. | 427/308 |
| 6,080,816 A | * | 6/2000 | Gregorovich et al. | 525/100 |
| 6,132,808 A | * | 10/2000 | Brown et al. | 427/387 |
| 6,319,351 B1 | * | 11/2001 | Dixon | 156/314 |
| 6,342,097 B1 | * | 1/2002 | Terry et al. | 106/287.13 |
| 6,410,151 B1 | * | 6/2002 | Kurosawa et al. | 428/447 |
| 2001/0051446 A1 | * | 12/2001 | Inoue et al. | 438/780 |
| 2002/0189495 A1 | * | 12/2002 | Hayashi et al. | 106/287.13 |
| 2003/0159997 A1 | * | 8/2003 | Markowitz et al. | 210/670 |
| 2005/0096415 A1 | * | 5/2005 | Akiyama et al. | 524/261 |
| 2006/0233958 A1 | * | 10/2006 | Matsumura et al. | 427/402 |
| 2007/0065356 A1 | * | 3/2007 | Cabrera et al. | 423/338 |
| 2009/0069508 A1 | | 3/2009 | Poe et al. | |

FOREIGN PATENT DOCUMENTS

| | | |
|---|---|---|
| JP | 2005-232024 A | 9/2005 |
| KR | 1020070013303 A | 1/2007 |
| KR | 1020070034470 A | 3/2007 |

OTHER PUBLICATIONS

Burleigh et al. "Direct Synthesis of Periodic Mesoporous Organosilicas: Functional Incorporation by Co-Condensation with Organosilanes", J. Phys. Chem. B, 2001, 105, 9935-9942.*

(Continued)

*Primary Examiner* — Robert S Loewe
(74) *Attorney, Agent, or Firm* — Cantor Colburn LLP

(57) ABSTRACT

Disclosed are an organosilicate compound represented by the following Chemical Formula 1, and a composition and a film including the same.

Chemical Formula 1

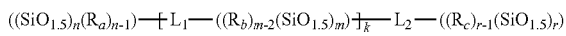

$((SiO_{1.5})_n(R_a)_{n-1}) \!\!-\!\!\left[\!L_1\!-\!((R_b)_{m\text{-}2}(SiO_{1.5})_m)\!\right]_{\!k}\!\!-\!L_2\!-\!((R_c)_{r\text{-}1}(SiO_{1.5})_r)$ In the above Chemical Formula 1, each substituent is as defined in the detailed description.

17 Claims, 5 Drawing Sheets

OTHER PUBLICATIONS

Seino et al. "Hydrosilylation Polymerization of Double-Decker-Shaped Silsesquioxane Having Hydrosilane with Diynes", Macromolecules, 2006, 39(10), 3473-3475.*

Hatton, B.D. et al., Materials chemistry for low-k materials, Mat. Today, vol. 9, Issue 3, Mar. 2006, pp. 22-31.

Huang, J. et al., Cubic Silsesquioxane-Polyimide Nanocomposites with Improved Thermomechanical Properties and Dielectric Properties, Acta Materialia, 53, 2005, pp. 2395-2404.

Kim, H-J. et al., Substituent Effects on Microstructure and Polymerization of Polyalkylsilsesquioxanes, J. Am. Chem. Soc., 2001, 123 (48), pp. 12121-12122.

* cited by examiner

ORGANOSILICATE COMPOUND, AND COMPOSITION AND FILM INCLUDING THE SAME

CROSS-REFERENCE TO RELATED APPLICATION

This application claims priority to and the benefit of Korean Patent Application No. 10-2009-0106217 filed on Nov. 4, 2009, and all the benefits accruing therefrom under 35 U.S.C. §119, the content of which in its entirety is herein incorporated by reference.

BACKGROUND

1. Field

This disclosure relates to an organosilicate compound, and a composition and a film including the same.

2. Description of the Related Art

As the expansion of the mobile display market accelerates, there is an increased focus on developing display devices that are both light and flexible. In a flexible display, the substrate generally determines the performance, reliability, and price of the display device. A common substrate is glass, which exhibits excellent properties such as transparency, high heat resistance, and a low coefficient of thermal expansion ("CTE"). However, glass substrates are neither light nor flexible, as required for future mobile display technology. As a result, there is demand for a new material that satisfies these criteria.

While plastics have the potential to meet this demand, current candidate material for plastic substrates such as polyimide, polyethylene, and polyethylene naphthalate do not exhibit the required heat resistance, transparency, and flexibility. Accordingly, there remains a need in the art for polymers with improved properties for use in display devices.

SUMMARY

In an embodiment, this disclosure provides an organosilicate compound that, when added to a polymer composition, is capable of improving thermal properties and light transmittance properties of films formed from the polymer composition.

Another embodiment of this disclosure provides a composition including an organosilicate compound and a polymer, and a film formed from such a composition that exhibits improved thermal properties and light transmittance properties.

According to an embodiment, an organosilicate compound represented by the following Chemical Formula 1 is provided.

Chemical Formula 1

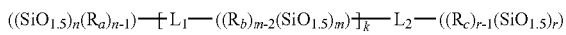

In the above Chemical Formula 1, n, each m, and r are the same or different, and independently range from about 4 to about 12, k is an integer from 0 to about 10, each $L_1$ and $L_2$ is a linker that is independently a substituted or unsubstituted C1 to C30 alkylene group, a substituted or unsubstituted C1 to C30 alkyleneoxy group, a substituted or unsubstituted C1 to C30 fluoroalkylene group, a substituted or unsubstituted C3 to C30 cycloalkylene group, a substituted or unsubstituted 3- to 30-membered heterocycloalkylene group, a substituted or unsubstituted C6 to C30 arylene group, a substituted or unsubstituted C6 to C30 aryleneoxy group, a substituted or unsubstituted 5- to 30-membered heteroarylene group, a substituted or unsubstituted C2 to C30 alkenylene group, a substituted or unsubstituted C2 to C30 alkynylene group, or a substituted or unsubstituted C1 to C30 amide group, and $R_a$, $R_b$, and $R_c$ are the same or different, and are independently hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C3 to C15 cycloalkyloxy group, a substituted or unsubstituted C6 to C15 aryl group, a substituted or unsubstituted C6 to C15 aryloxy group, a substituted or unsubstituted 5- to 15-membered heteroaryl group, a substituted or unsubstituted C2 to C15 alkenyl group, a substituted or unsubstituted C2 to C15 alkynyl group, $NH_2$, a substituted or unsubstituted C1 to C15 amine group, a substituted or unsubstituted C1 to C15 alkyleneamine group, a substituted or unsubstituted C6 to C15 arylene-amine group, a substituted or unsubstituted C2 to C15 alkenyleneamine group, or a functional group represented by the following Chemical Formula 2, provided that at least one of $R_a$, $R_b$, and $R_c$ is $NH_2$, a substituted or unsubstituted C1 to C15 amine group, or a substituted or unsubstituted C1 to C15 alkyleneamine group.

Chemical Formula 2

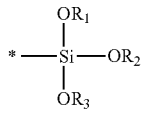

In the above Chemical Formula 2, $R_1$, $R_2$, and $R_3$ are the same or different, and are independently hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C6 to C15 aryl group, a substituted or unsubstituted 5- to 15-membered heteroaryl group, a substituted or unsubstituted C2 to C15 alkenyl group, or a substituted or unsubstituted C2 to C15 alkynyl group.

In certain embodiments, the organosilicate compound of the above Chemical Formula 1 includes about 5 to about 50 mole percent ("mol %") of an amine functional group, based on the moles of silicon-containing units in the organosilicate compound.

In further embodiments, the organosilicate compound of the above Chemical Formula 1 has a number average molecular weight of about 500 to about 100,000, more specifically about 1100 to 2000, and has a polydispersity index ("PDI," Mw/Mn) of about 1 to about 2. The PDI is the weight average molecular weight ("Mw") divided by the number average molecular weight ("Mn").

The organosilicate compound of the above Chemical Formula 1 is, in still further embodiments, prepared by reacting a silane compound of the following Chemical Formula 3 with a silane compound of the following Chemical Formula 4.

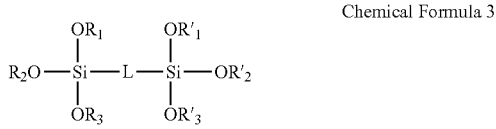

Chemical Formula 3

In the above Chemical Formula 3, $R_1$, $R_2$, $R_3$, $R'_1$, $R'_2$ and $R'_3$ are the same or different, and are each independently as described for $R_1$, $R_2$ and $R_3$ in Chemical Formula 2, and L is the same as $L_1$ and $L_2$ in Chemical Formula 1.

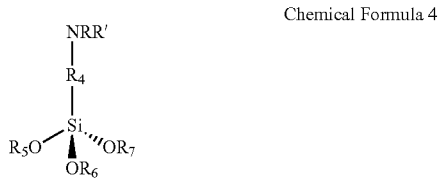

Chemical Formula 4

In the above Chemical Formula 4, $R_4$ is a linker of a single bond, a substituted or unsubstituted C1 to C30 alkylene group, a substituted or unsubstituted C1 to C30 alkyleneoxy group, a substituted or unsubstituted C1 to C30 fluoroalkylene group, a substituted or unsubstituted C3 to C30 cycloalkylene group, a substituted or unsubstituted 3- to 30-membered heterocycloalkylene group, a substituted or unsubstituted C6 to C30 arylene group, a substituted or unsubstituted C6 to C30 aryleneoxy group, a substituted or unsubstituted 5- to 30-membered heteroarylene group, a substituted or unsubstituted C2 to C30 alkenylene group, a substituted or unsubstituted C2 to C30 alkynylene group, or a substituted or unsubstituted C1 to C30 amide group, R and R' are the same or different, and are independently hydrogen or a substituted or unsubstituted C1 to C15 alkyl group, and $R_5$, $R_6$, and $R_7$ are the same or different, and are independently hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C6 to C15 aryl group, a substituted or unsubstituted 5- to 15-membered heteroaryl group, a substituted or unsubstituted C2 to C15 alkenyl group, or a substituted or unsubstituted C2 to C15 alkynyl group.

Within certain exemplary embodiments, a composition is provided that includes the silane compound of the above Chemical Formula 3 in an amount of about 0.1 weight percent (wt %) to about 99.9 wt % and the silane compound of the above Chemical Formula 4 in an amount of about 99.9 wt % to about 0.1 wt %.

In further embodiments, the organosilicate compound of above Chemical Formula 1 may be obtained by reacting a silane compound of the following Chemical Formula 5 with a silane compound of the above Chemical Formula 3 and a silane compound of the above Chemical Formula 4.

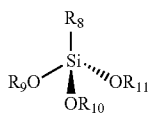

Chemical Formula 5

In the above Chemical Formula 5, $R_8$ is hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C3 to C15 cycloalkyloxy group, a substituted or unsubstituted C6 to C15 aryl group, a substituted or unsubstituted C6 to C15 aryloxy group, a substituted or unsubstituted 5- to 15-membered heteroaryl group, a substituted or unsubstituted C2 to C15 alkenyl group, or a substituted or unsubstituted C2 to C15 alkynyl group, and $R_9$, $R_{10}$, and $R_{11}$ are the same or different, and are independently hydrogen, a substituted or unsubstituted C1 to C15 alkyl group, a substituted or unsubstituted C1 to C15 fluoroalkyl group, a substituted or unsubstituted C3 to C15 cycloalkyl group, a substituted or unsubstituted 3- to 15-membered heterocycloalkyl group, a substituted or unsubstituted C6 to C15 aryl group, a substituted or unsubstituted 5- to 15-membered heteroaryl group, a substituted or unsubstituted C2 to C15 alkenyl group, or a substituted or unsubstituted C2 to C15 alkynyl group.

Within certain exemplary embodiments, a composition is provided that includes the silane compound of the above Chemical Formula 5 in an amount from about 0.1 to about 100 parts by weight based on 100 parts by weight of the silane compound of Chemical Formula 3.

According to another embodiment of this disclosure, a composition including the organosilicate compound and a polymer is provided. Representative polymers include, but are not limited to, polyamic acid, polyimide, aramid, polyamide, polyurethane, and combinations thereof.

According to another embodiment of this disclosure, a substrate including the organosilicate compound and a polymer is provided.

Representative polymers include, but are not limited to, polyimide, aramide, polyamide, polyurethane, or a combination thereof.

Within such a substrate, in certain embodiments, the organosilicate compound may be included in an amount of about 0.1 wt % to about 50 wt %, and the polymer may be included in an amount of about 50 wt % to about 99.9 wt %.

Within certain representative embodiments, the substrate is a film. The film may, for example, have a coefficient of thermal expansion ("CTE") from about 10 ppm/° C. to about 50 ppm/° C., a yellow index from about 2.0 to about 7.0, and/or a light transmittance from about 80% to about 94%.

BRIEF DESCRIPTION OF THE DRAWINGS

These and/or other aspects will become apparent and more readily appreciated from the following description of the embodiments, taken in conjunction with the accompanying drawings.

DETAILED DESCRIPTION

Figure 1:
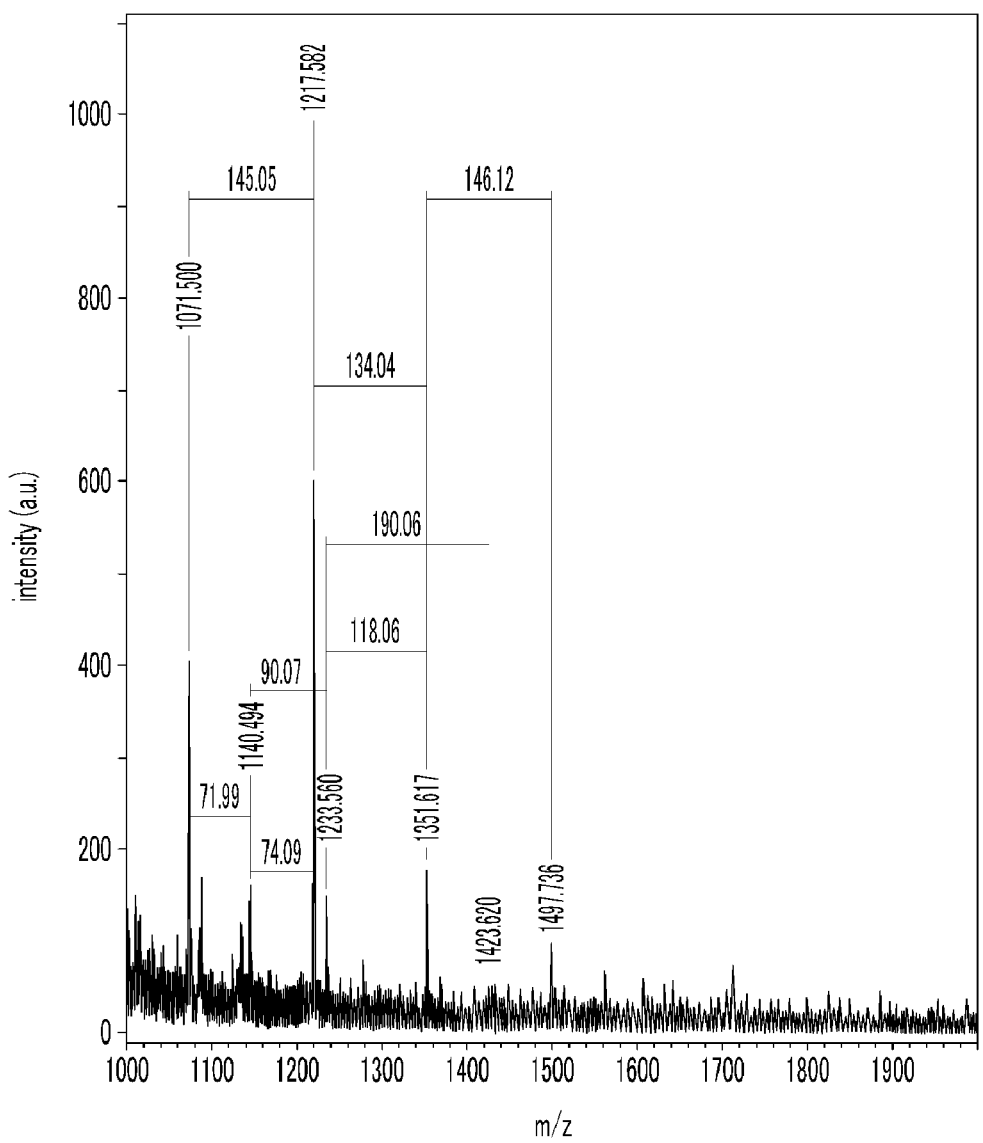
FIG. 1 is a spectrum illustrating the results of a MALDI-TOF mass spectroscopy analysis of the representative organosilicate compound of Example 2.

This disclosure will be described more fully in the following detailed description of the invention, and with reference to the accompanying drawings, in which some but not all embodiments of the disclosure are described. This disclosure may, however, be embodied in many different forms and is not to be construed as limited to the exemplary embodiments set forth herein; rather, these embodiments are provided so that this disclosure will be thorough and complete, and will fully convey the scope of the invention to those skilled in the art. Like reference numerals and variables refer to like elements throughout.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements and/or components, but do not preclude the presence or addition of one or more other features, regions, integers, steps, operations, elements, components and/or groups thereof.

Unless otherwise defined, all terms (including technical and scientific terms) used herein have the same meaning as commonly understood by one of ordinary skill in the art to which this invention belongs.

As used herein, when a definition is not otherwise provided, the term "substituted" refers to a compound or radical substituted with at least one (e.g., 1, 2, 3, 4, 5, 6 or more) substituent independently chosen from a C1 to C10 alkoxy group, a carboxyl group (which includes both the acid and salt forms), a straight or branched chain C1 to C10 alkyl group, a straight or branched chain C2 to C10 alkenyl group, a straight or branched chain C2 to C10 alkynyl group, a C3 to C10 cycloalkyl group, a C3 to C10 cycloalkenyl group, a C3 to C10 cycloalkynyl group, a C2 to C10 heterocycloalkyl group containing at least one (e.g., 1, 2, 3, or 4) heteroatom in the ring thereof, a C2 to C10 heterocycloalkenyl group containing at least one (e.g., 1, 2, 3, or 4) heteroatom in the ring thereof, a C2 to C10 heterocycloalkynyl group containing at least one (e.g., 1, 2, 3, or 4) heteroatom in the ring thereof, a C6 to C20 aryl group, or a C2 to C20 heteroaryl group containing at least one (e.g., 1, 2, 3, or 4) heteroatom in the ring thereof.

"Alkyl" as used herein is a straight or branched chain saturated aliphatic hydrocarbon group. Alkyl groups include, for example, groups having from 1 to 15 carbon atoms (C1 to C15 alkyl). "Alkenyl" means a straight or branched chain hydrocarbon that includes at least one carbon-carbon double bond; and "alkynyl" means a straight or branched chain hydrocarbon that has one or more unsaturated carbon-carbon bonds, at least one of which is a triple bond. Exemplary alkenyl and alkynyl groups include, for example, groups having from 2 to 15 carbon atoms.

"Fluoroalkyl" is an alkyl group in which at least one hydrogen is replaced with fluorine.

"Cycloalkyl" as used herein is a group that includes one or more saturated rings in which all ring members are carbon, such as cyclopropyl, cyclobutyl, cyclopentyl, cyclohexyl, cycloheptyl, cyclooctyl, and adamantyl. "Cycloalkenyl" and "cycloalkynyl" mean groups that include one or more partially saturated rings (i.e., rings with at least one double bond are "cycloalkenyl," and rings with at least one triple bond are "cycloalkynyl") in which all ring members are carbon. Representative examples include the partially saturated variants of the foregoing (e.g., cyclohexenyl). Cycloalkyl, cycloalkenyl, and cycloalkynyl groups do not include an aromatic ring or a heterocyclic ring. When numbers of carbon atoms are recited (e.g., C1 to C10 cycloalkyl), these numbers indicate the number of ring members.

"Cycloalkyloxy" as used herein is a cycloalkyl group as described above that is linked via an oxygen (i.e., —O-cycloalkyl).

"Alkoxy" as used herein is an alkyl moiety that is linked via an oxygen (i.e., —O-alkyl).

"C1 to C30 amide group" is a group of the formula —C(O)—N($R_x$)— or —N—C(O)—, wherein $R_x$ is hydrogen, a C1 to C29 alkyl, a C1 to C29 alkenyl, a C2 to C29 alkynyl, a C3 to C29 cycloalkyl or a C6 to C29 aryl.

A "C1 to C15 amine group" is a group of the formula —N($R_w$)($R_z$), wherein $R_w$ is a C1 to C15 alkyl, a C2 to C15 alkenyl, a C2 to C15 alkynyl, a C3 to C15 cycloalkyl or a C6 to C15 aryl; and $R_z$ is independently hydrogen or any of the groups listed for $R_w$ such that the total number of carbon atoms in $R_w$ and $R_z$ is from 1 to 15.

A "C1 to C15 alkyleneamine group" is a group of the formula -Q-N($R_w$)($R_z$), wherein Q is a C1 to C15 alkylene, and $R_w$ and $R_z$ are each independently hydrogen, a C1 to C14 alkyl, a C1 to C14 alkenyl, a C1 to C14 alkynyl, a C3 to C14 cycloalkyl or a C6 to C14 aryl; such that the total number of carbon atoms in Q, $R_w$ and $R_z$ is from 1 to 15. Accordingly, a "C1 to C15 alkenyleneamine group" is a group of the formula -Q-N($R_w$)($R_z$), wherein Q is a C1 to C15 alkenylene group, and $R_w$ and $R_z$ are as defined above, such that the total number of carbon atoms in Q, $R_w$ and $R_z$ is from 1 to 15.

"Aryl" as used herein is a cyclic moiety in which all ring members are carbon and at least one ring is aromatic. More than one ring may be present, and any additional rings may be independently aromatic, saturated or partially unsaturated, and may be fused, pendant, spirocyclic or a combination thereof. "Aryloxy," as used herein is an aryl group that is linked via an oxygen (i.e., —O-aryl).

Through the present disclosure, reference is made to various heterocyclic groups. Within such groups, the term "hetero" refers to a group that includes at least one member that is a heteroatom (e.g., 1, 2, or 3 heteroatoms that are independently N, O, S, P, or Si). Heterocycloalkyl groups include at least one non-aromatic ring that contains a heteroatom ring member. Heteroaryl groups include at least one aromatic ring that contains a heteroatom ring member. If multiple rings are present, each ring is independently aromatic, saturated or partially unsaturated and multiple rings, if present, may be fused, pendant, spirocyclic or a combination thereof. Thus, non-aromatic and/or carbocyclic rings may also be present in a heteroaryl group, provided that at least one ring is both aromatic and contains a ring member that is a heteroatom.

Throughout this disclosure, reference is made to various bivalent moieties. Such moieties are the same as the monovalent groups that are similarly named, and are typically indicated with an "ene" suffix. For example, an "alkylene" moiety is a bivalent alkyl group; and an "alkyleneoxy" moiety is a bivalent alkyl group linked at one point via an oxygen atom. A C6 to C15 arylene group is a bivalent linking group that has the same structure as a C6 to C15 aryl group, and a 5- to 15-membered heteroarylene group is a bivalent linking group having the same structure as a 5- to 15-membered heteroaryl group. An "aryleneoxy" moiety is a bivalent aryl group linked at one point via an oxygen. According to an embodiment, an organosilicate compound represented by the following Chemical Formula 1 is provided.

Chemical Formula 1

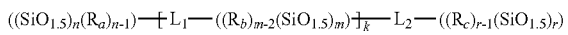

In the above Chemical Formula 1, n, each m, and r are the same or different and each independently is from about 4 to about 12, for example, 4, 6, 8, or 10, or 12, k is an integer from 0 to about 10, more specifically 0 to 9;

each $L_1$ and $L_2$ is a linker that is independently a substituted or unsubstituted C1 to C30 alkylene group, for example a substituted or unsubstituted C1 to C12 alkylene group or a substituted or unsubstituted C1 to C6 alkylene group, a substituted or unsubstituted C1 to C30 alkyleneoxy group, for example a substituted or unsubstituted C1 to C12 alkyleneoxy group or a substituted or unsubstituted C1 to C6 alkyleneoxy group, a substituted or unsubstituted C1 to C30 fluoroalkylene group, for example a substituted or unsubstituted C1 to C12 fluoroalkylene group or a substituted or unsubstituted C1 to C6 fluoroalkylene group, a substituted or unsubstituted C3 to C30 cycloalkylene group, for example a substituted or unsubstituted C3 to C24 cycloalkylene group or a substituted or unsubstituted C3 to C12 cycloalkylene group, a substituted or unsubstituted 3- to 30-membered heterocycloalkylene group, for example a substituted or unsubstituted 3- to 20-membered heterocycloalkylene group or a substituted or unsubstituted 3- to 12-membered heterocycloalkylene group, a substituted or unsubstituted C6 to C30 arylene group, for example a substituted or unsubstituted C6 to C20 arylene group or a substituted or unsubstituted C6 to C12 arylene group, a substituted or unsubstituted C6 to C30 aryleneoxy group, for example a substituted or unsubstituted C6 to C20 aryleneoxy group, or a substituted or unsubstituted C6 to C12 aryleneoxy group, a substituted or unsubstituted 5- to 30-membered heteroarylene group, for example a substituted or unsubstituted 5- to 20-membered heteroarylene group, a substituted or unsubstituted 5- to 12-membered heteroarylene group, a substituted or unsubstituted C2 to C30 alkenylene group, for example a substituted or unsubstituted C2 to C20 alkenylene group or a substituted or unsubstituted C2 to C12 alkenylene group, a substituted or unsubstituted C2 to C30 alkynylene group, for example a substituted or unsubstituted C2 to C20 alkynylene group or a substituted or unsubstituted C2 to C12 alkynylene group, or a substituted or unsubstituted C1 to C30 amide group, for example a substituted or unsubstituted C1 to C20 amide group or a substituted or unsubstituted C1 to C12 amide group, each $R_a$, $R_b$, and $R_c$ are the same or different, and are independently hydrogen, a substituted or unsubstituted C1 to C15 alkyl group, for example a substituted or unsubstituted C1 to C10 alkyl group or a substituted or unsubstituted C1 to C4 alkyl group, a substituted or unsubstituted C1 to C15 alkoxy group, for example a substituted or unsubstituted C1 to C10 alkoxy group or a substituted or unsubstituted C1 to C4 alkoxy group, a substituted or unsubstituted C1 to C15 fluoroalkyl group, for example a substituted or unsubstituted C1 to C10 fluoroalkyl group or a substituted or unsubstituted C1 to C4 fluoroalkyl group, a substituted or unsubstituted C3 to C15 cycloalkyl group, for example a substituted or unsubstituted C4 to C10 cycloalkyl group or a substituted or unsubstituted C5 to C8 cycloalkyl group, a substituted or unsubstituted 3- to 15-membered heterocycloalkyl group, for example a substituted or unsubstituted 3- to 10-membered heterocycloalkyl group or a substituted or unsubstituted 3- to 6-membered heterocycloalkyl group, a substituted or unsubstituted C3 to C15 cycloalkyloxy group, for example a substituted or unsubstituted C3 to C10 cycloalkyloxy group or a substituted or unsubstituted C3 to C6 cycloalkyloxy group, a substituted or unsubstituted C6 to C15 aryl group, for example a substituted or unsubstituted C6 to C14 aryl group or a substituted or unsubstituted C6 to C12 aryl group, a substituted or unsubstituted C6 to C15 aryloxy group, for example a substituted or unsubstituted C6 to C14 aryloxy group or a substituted or unsubstituted C6 to C12 aryloxy group, a substituted or unsubstituted 5- to 15-membered heteroaryl group, for example a substituted or unsubstituted 2- to 10-membered heteroaryl group or a substituted or unsubstituted 2- to 8-membered heteroaryl group, a substituted or unsubstituted C2 to C15 alkenyl group, for example a substituted or unsubstituted C2 to C10 alkenyl group or a substituted or unsubstituted C2 to C8 alkenyl group, a substituted or unsubstituted C2 to C15 alkynyl group, for example a substituted or unsubstituted C2 to C10 alkynyl group or a substituted or unsubstituted C2 to C8 alkynyl group, $NH_2$, a substituted or unsubstituted C1 to C15 amine group, for example a substituted or unsubstituted C1 to C10 amine group or a substituted or unsubstituted C1 to C8 amine group, a substituted or unsubstituted C1 to C15 alkyleneamine group, for example a substituted or unsubstituted C1 to C10 alkyleneamine group or a substituted or unsubstituted C1 to C8 alkyleneamine group, or a functional group represented by the following Chemical Formula 2, provided that at least one of $R_a$, $R_b$, and $R_c$ is $NH_2$, a substituted or unsubstituted C1 to C15 amine group, for example a substituted or unsubstituted C1 to C10 amine group or a substituted or unsubstituted C1 to C8 amine group, or a substituted or unsubstituted C1 to C15 alkyleneamine group, for example a substituted or unsubstituted C1 to C10 alkyleneamine group or a substituted or unsubstituted C1 to C8 alkyleneamine group.

Chemical Formula 2

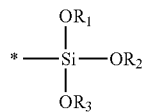

In the above Chemical Formula 2, $R_1$, $R_2$, and $R_3$ are the same or different, and are independently hydrogen, a substituted or unsubstituted C1 to C15 alkyl group, for example a substituted or unsubstituted C1 to C10 alkyl group or a substituted or unsubstituted C1 to C4 alkyl group, a substituted or unsubstituted C1 to C15 fluoroalkyl group, for example a substituted or unsubstituted C1 to C10 fluoroalkyl group or a substituted or unsubstituted C1 to C4 fluoroalkyl group, a substituted or unsubstituted C3 to C15 cycloalkyl group, for example a substituted or unsubstituted C4 to C10 cycloalkyl group or a substituted or unsubstituted C5 to C8 cycloalkyl group, a substituted or unsubstituted 3- to 15-membered heterocycloalkyl group, for example a substituted or unsubstituted 2- to 10-membered heterocycloalkyl group or a substituted or unsubstituted 2- to 6-membered heterocycloalkyl group, a substituted or unsubstituted C6 to C15 aryl group, for example a substituted or unsubstituted C6 to C14 aryl group or a substituted or unsubstituted C6 to C12 aryl group, a substituted or unsubstituted 5- to 15-membered heteroaryl group, for example a substituted or unsubstituted 2- to 10-membered heteroaryl group or a substituted or unsubstituted 2- to 8-membered heteroaryl group, a substituted or unsubstituted C2 to C15 alkenyl group, for example a substituted or unsubstituted C2 to C10 alkenyl group or a substituted or unsubstituted C2 to C8 alkenyl group, or a substituted or unsubstituted C2 to C15 alkynyl group, for example a substituted or unsubstituted C2 to C10 alkynyl group or a substituted or unsubstituted C2 to C8 alkynyl group.

In the above Chemical Formula 1, n, each m, and r is independently from about 4 to about 12. When each is 4, $(SiO_{1.5})_n(R_a)_{n-1}$, $(R_b)_{m-2}(SiO_{1.5})_m$ or $(R_c)_{r-1}(SiO_{1.5})_r$ forms a random branched structure individually, and when each is 6, $SiO_{1.5})_n(R_a)_{n-1}$, $(R_b)_{m-2}(SiO_{1.5})_m$ or $(R_c)_{r-1}(SiO_{1.5})_r$ forms a partial cage structure individually. When each is equal to or greater than 8, $(SiO_{1.5})_n(R_a)_{n-1}$, $(R_b)_{m-2}(SiO_{1.5})_m$ or $(R_c)_{r-1}(SiO_{1.5})_r$ forms a cage structure individually.

A silane compound or silsesquioxane-based silane compound that differs from the compounds described herein may be added to an organic polymer and used as a filler to improve physical properties. However, since a free alkyl group at a terminal has a high mobility property, the coefficient of thermal expansion may be increased, thereby potentially deteriorating the thermal properties of a polymer film. Also, such a silane compound or silsesquioxane-based silane compound may not be dispersed in a polymer matrix sufficiently. In order to solve such problems, a dispersing agent may be added, but dispersing agents have been known to decrease the performance of a polymer.

According to one embodiment, an organosilicate compound of Chemical Formula 1 including more than 2 silsesquioxanes connected through a hydrocarbon group (L) may be added to an organic polymer to improve a physical property of the polymer. For example, without being bound by theory, addition of the organosilicate compound of Chemical Formula 1 including more than 2 silsesquioxanes connected through a hydrocarbon group (L) may decrease the coefficient of thermal expansion by reducing the number of terminal alkyl groups, as compared to individual silsesquioxanes. Because a terminal group (such as $CH_3$) can rotate freely, a significant amount of this type of group can increase the CTE of the resulting film. Reduction of the number of terminal alkyl groups, as in the present organosilicate compounds can therefore result in a decrease in the CTE of a film formed from the organosilicate compound and the polymer. Thus, when the organosilicate compound is combined with a polymer to provide a film, the coefficient of thermal expansion of the film is reduced and the light transmittance may be improved.

Further, the organosilicate compound of the above Chemical Formula 1 may be easily mixed with an organic polymer due to an amine functional group included at its terminal end. Therefore, a composition for a film may be prepared easily by mixing the organosilicate compound with an organic polymer without a dispersing agent, thereby avoiding problems commonly associated with the use of a dispersing agent.

In certain embodiments, the organosilicate compound of the above Chemical Formula 1 may include an amine functional group in an amount from about 5 to about 50 mol %, based on the moles of silicon-containing units in the organosilicate compound. When the amine functional group is included within the range, the miscibility and the compatibility with the organic polymer having an amine group or amide group may be improved.

The organosilicate compound of the above Chemical Formula 1 may, within further embodiments, have a number average molecular weight of about 500 to about 100,000 and/or a PDI of about 1 to about 2. When the number average molecular weight and PDI of the organosilicate compound are within these ranges, miscibility and a compatibility with the organic polymer may be improved.

The organosilicate compound of the above Chemical Formula 1 is, in certain embodiments, prepared by reacting at least one silane compound of the following Chemical Formula 3 with at least one silane compound of the following Chemical Formula 4. Such reaction may, in certain representative embodiments, be performed in water; in further embodiments, a solvent such as N,N-dimethyl acetamide may be present. Representative reaction conditions include, but are not limited to, an hour or less (e.g., about 10 minutes) at 0° C. followed by one or more hours at an elevated temperature (e.g., 5 hours at 65° C.).

Chemical Formula 3

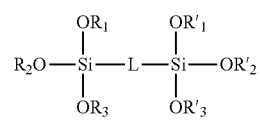

In the above Chemical Formula 3, $R_1$, $R_2$, $R_3$, $R'_1$, $R'_2$, and $R'_3$ are the same or different, and are independently as described for $R_1$, $R_2$, and $R_3$ in Chemical Formula 2. L is the same as $L_1$ and $L_2$ in Chemical Formula 1.

Chemical Formula 4

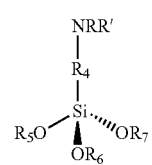

In the above Chemical Formula 4, $R_4$ is a linker of a single bond, a substituted or unsubstituted C1 to C30 alkylene group, for example a substituted or unsubstituted C1 to C12 alkylene group or a substituted or unsubstituted C1 to C6 alkylene group a substituted or unsubstituted C1 to C30 alkyleneoxy group, for example a substituted or unsubstituted C1 to C12 alkyleneoxy group or a substituted or unsubstituted C1 to C6 alkyleneoxy group, a substituted or unsubstituted C1 to C30 fluoroalkylene group, for example a substituted or unsubstituted C1 to C12 fluoroalkylene group or a substituted or unsubstituted C1 to C6 fluoroalkylene group, a substituted or unsubstituted C3 to C30 cycloalkylene group, for example a substituted or unsubstituted C3 to C24 cycloalkylene group or a substituted or unsubstituted C3 to C12 cycloalkylene group, a substituted or unsubstituted 3- to 30-membered heterocycloalkylene group, for example a substituted or unsubstituted 3- to 20-membered heterocycloalkylene group or a substituted or unsubstituted 3- to 12-membered heterocycloalkylene group, a substituted or unsubstituted C6 to C30 arylene group, for example a substituted or unsubstituted C6 to C20 arylene group or a substituted or unsubstituted C6 to C12 arylene group, a substituted or unsubstituted C6 to C30 aryleneoxy group, for example a substituted or unsubstituted C6 to C20 aryleneoxy group, or a substituted or unsubstituted C6 to C12 aryleneoxy group, a substituted or unsubstituted 5- to 30-membered heteroarylene group, for example a substituted or unsubstituted 5- to 20-membered heteroarylene group, a substituted or unsubstituted 5- to 12-membered heteroarylene group, a substituted or unsubstituted C2 to C30 alkenylene group, for example a substituted or unsubstituted C2 to C20 alkenylene group or a substituted or unsubstituted C2 to C12 alkenylene group, a substituted or unsubstituted C2 to C30 alkynylene group, for example a substituted or unsubstituted C2 to C20 alkynylene group or a substituted or unsubstituted C2 to C12 alkynylene group, or a substituted or unsubstituted C1 to C30 amide group, for example a substituted or unsubstituted C1 to C20 amide group or a substituted or unsubstituted C1 to C12 amide group, R and R' are the same or different, and are independently hydrogen or a substituted or unsubstituted C1 to C15 alkyl group, for example a substituted or unsubstituted C1 to C10 alkyl group or a substituted or unsubstituted C1 to C4 alkyl group, and $R_5$, $R_6$, and $R_7$ are the same or different, and are independently hydrogen, a substituted or unsubstituted C1 to C15 alkyl group, for example a substituted or unsubstituted C1 to C10 alkyl group or a substituted or unsubstituted C1 to C4 alkyl group, a substituted or unsubstituted C1 to C15 fluoroalkyl group, for example a substituted or unsubstituted C1 to C10 fluoroalkyl group or a substituted or unsubstituted C1 to C4 fluoroalkyl group, a substituted or unsubstituted C3 to C15 cycloalkyl group, for example a substituted or unsubstituted C4 to C10 cycloalkyl group or a substituted or unsubstituted C5 to C8 cycloalkyl group, a substituted or unsubstituted 3- to 15-membered heterocycloalkyl group, for example a substituted or unsubstituted 2- to 10-membered heterocycloalkyl group or a substituted or unsubstituted 2- to 4-membered heterocycloalkyl group, a substituted or unsubstituted C6 to C15 aryl group, for example a substituted or unsubstituted C6 to C14 aryl group or a substituted or unsubstituted C6 to C12 aryl group, a substituted or unsubstituted 5- to 15-membered heteroaryl group, for example a substituted or unsubstituted 2- to 10-membered heteroaryl group or a substituted or unsubstituted 2- to 8-membered heteroaryl group, a substituted or unsubstituted C2 to C15 alkenyl group, for example a substituted or unsubstituted C2 to C10 alkenyl group or a substituted or unsubstituted C2 to C8 alkenyl group, or a substituted or unsubstituted C2 to C15 alkynyl group for example a substituted or unsubstituted C2 to C10 alkynyl group or a substituted or unsubstituted C2 to C8 alkynyl group.

In certain embodiments, during synthesis of the organosilicate compound of Chemical Formula 1, the silane compound of the above Chemical Formula 3 may be used in an amount of about 0.1 wt % to about 99.9 wt %, and the silane compound of the above Chemical Formula 4 may be used in an amount of about 99.9 wt % to about 0.1 wt %. According to another embodiment, the silane compound of the above Chemical Formula 3 may be used in an amount of 20 wt % to 50 wt %, and the silane compound of the above Chemical Formula 4 may be used in an amount of about 80 wt % to about 50 wt %. When the silane compounds are used within the above ranges, the amount of the amine functional group of the organosilicate compound represented by the above Chemical Formula 1 may be readily controlled to a desired amount.

In certain embodiments, the organosilicate compound represented by the above Chemical Formula 1 may be prepared by reacting a silane compound of the following Chemical Formula 5 with a silane compound of the Chemical Formula 3 and a silane compound of Chemical Formula 4.

Chemical Formula 5

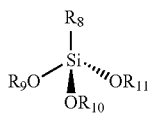

In the above Chemical Formula 5, $R_8$ is hydrogen, a substituted or unsubstituted C1 to C15 alkyl group, a substituted or unsubstituted C1 to C15 alkoxy group, for example a substituted or unsubstituted C1 to C10 alkyl group or a substituted or unsubstituted C1 to C4 alkyl group, a substituted or unsubstituted C1 to C15 fluoroalkyl group, for example a substituted or unsubstituted C1 to C10 fluoroalkyl group or a substituted or unsubstituted C1 to C4 fluoroalkyl group, a substituted or unsubstituted C3 to C15 cycloalkyl group, for example a substituted or unsubstituted C4 to C10 cycloalkyl group or a substituted or unsubstituted C5 to C8 cycloalkyl group, a substituted or unsubstituted 3- to 15-membered heterocycloalkyl group, for example a substituted or unsubstituted 3- to 10-membered heterocycloalkyl group or a substituted or unsubstituted 3- to 6-membered heterocycloalkyl group, a substituted or unsubstituted C3 to C15 cycloalkyloxy group, for example a substituted or unsubstituted C4 to C12 cycloalkyloxy group or a substituted or unsubstituted C5 to C10 cycloalkyloxy group, a substituted or unsubstituted C6 to C15 aryl group, for example a substituted or unsubstituted C6 to C14 aryl group or a substituted or unsubstituted C6 to C12 aryl group, a substituted or unsubstituted C6 to C15 aryloxy group, for example a substituted or unsubstituted C6 to C14 aryloxy group or a substituted or unsubstituted C6 to C12 aryloxy group, a substituted or unsubstituted 5- to 15-membered heteroaryl group, for example a substituted or unsubstituted 2- to 10-membered heteroaryl group or a substituted or unsubstituted 2- to 8-membered heteroaryl group, a substituted or unsubstituted C2 to C15 alkenyl group, for example a substituted or unsubstituted C2 to C10 alkenyl group or a substituted or unsubstituted C2 to C8 alkenyl group or a substituted or unsubstituted C2 to C15 alkynyl group, for example a substituted or unsubstituted C2 to C10 alkynyl group or a substituted or unsubstituted C2 to C8 alkynyl group, and $R_9$, $R_{10}$, and $R_{11}$ are the same or different, and are independently hydrogen, a substituted or unsubstituted C1 to C15 alkyl group, for example a substituted or unsubstituted C1 to C10 alkyl group or a substituted or unsubstituted C1 to C4 alkyl group, a substituted or unsubstituted C1 to C15 fluoroalkyl group, for example a substituted or unsubstituted C1 to C10 fluoroalkyl group or a substituted or unsubstituted C1 to C4 fluoroalkyl group, a substituted or unsubstituted C3 to C15 cycloalkyl group, for example a substituted or unsubstituted C4 to C10 cycloalkyl group or a substituted or unsubstituted C5 to C8 cycloalkyl group, a substituted or unsubstituted 3- to 15-membered heterocycloalkyl group, for example a substituted or unsubstituted 2- to 10-membered heterocycloalkyl group or a substituted or unsubstituted 2- to 4-membered heterocycloalkyl group, a substituted or unsubstituted C6 to C15 aryl group, for example a substituted or unsubstituted C6 to C14 aryl group or a substituted or unsubstituted C6 to C12 aryl group, a substituted or unsubstituted 5- to 15-membered heteroaryl group, for example a substituted or unsubstituted 2- to 10-membered heteroaryl group or a substituted or unsubstituted 2- to 8-membered heteroaryl group, a substituted or unsubstituted C2 to C15 alkenyl group, for example a substituted or unsubstituted C2 to C10 alkenyl group or a substituted or unsubstituted C2 to C8 alkenyl group, or a substituted or unsubstituted C2 to C15 alkynyl group, for example a substituted or unsubstituted C2 to C10 alkynyl group or a substituted or unsubstituted C2 to C8 alkynyl group.

In certain embodiments, the silane compound of above Chemical Formula 5 may be used in an amount of about 0.1 to about 100 parts by weight based on 100 parts by weight of the silane compound represented by Chemical Formula 3. When the silane compound(s) of above Chemical Formula 5 are used within the above range, the amount of the amine functional group of the organosilicate compound represented by the above Chemical Formula 1 may be readily controlled to a desired amount.

Without wishing to be bound to any particular theory, it is believed that the compounds of Chemical Formulae 3, 4, and 5 form siloxane bonds at a low temperature through hydrolysis reactions. The addition of compounds formed using such bonds to a polymer is believed to result in improved mechanical properties of a film prepared as described herein.

The organosilicate compound of the above Chemical Formula 1 may be used to form a composition for the preparation of various types of films. For example, the film-forming compositions can comprise the organosilicate compound represented by the above Chemical Formula 1 and a polymer component. The relative amounts of the organosilicate compound and the polymer component will depend on factors such as the type of organosilicate compound, the type of polymer(s) used in the polymer component, the intended use of the film, the desired properties of the film and like considerations, and can be determined without undue experimentation using the guidelines herein. For example, the organosilicate compound may be present in an amount of about 0.1 wt % to about 50 wt %, and the polymer component may be present in an amount of about 50 wt % to about 99.9 wt %. According to another embodiment, the organosilicate compound is present in an amount of about 0.5 wt % to about 20 wt %, and the polymer component is present in an amount of about 80 wt % to about 99.5 wt %. When the organosilicate compound and the polymer component are used in amounts that are within the above ranges, a composition having excellent thermal properties and optical properties may be prepared. A variety of polymers can be used in the polymer component, and are selected based on the compatibility with the organosilicate compound and the desired film properties. For example, the polymer may be a polyamic acid, polyimide, aramid, polyamide, polyurethane, or a mixture thereof.

The polymer component may further include one or more additives known for use in the formation of films, for example an antioxidant, ultraviolet light (UV) absorber, thermal stabilizer, and the like. The amount of each additive will depend on the type of additive and its desired function, and can be readily determined by one of ordinary skill in the art without undue experimentation. Generally, each additive is present in the polymer component in an amount of about 0.01 wt % to about 1 wt %, based on the total weight of the polymer component.

The film-forming composition may further include an inorganic material such a particulate filler, for example an oxide such as calcium carbonate, a ceramic such as a ceramic such as such as calcium carbonate, talc, mica, or kaolin (clay), or a reinforcing filler such as a glass fiber. Without being bound by theory, the organosilicate compound may improve compatibility between the polymer and the inorganic material. The amount of the inorganic material will depend on the type of inorganic material and its desired function, and can be readily determined by one of ordinary skill in the art without undue experimentation. Particulate fillers, for example, can be present in an amount of about 1 wt % to about 50 wt %, with the combination of the organosilicate compound and the polymer component being present in an amount of 50 wt % to 99 wt %. Reinforcing fillers, for example, can be present in an amount of about 10 wt % to about 80 wt %, with the combination of the organosilicate compound and the polymer component being present in an amount of 20 wt % to 90 wt %.

Certain of the film forming compositions may further include a solvent in order to improve a coating property of the film-forming composition. Examples of such solvents include dimethylsulfoxide; N-methyl-2-pyrrolidone; N,N-dimethyl formamide ("DMF"); N,N-dimethyl acetamide ("DMAc"); N-methylformamide ("NMF"); alcohols such as methanol, ethanol, 2-methyl-1-butanol, 2-methyl-2-butanol, and a combination thereof; esters including γ-butyrolactone; ketones including cyclohexanone, 3-hexanone, 3-heptanone, 3-octanone, acetone, methyl ethyl ketone, and a combination thereof; tetrahydrofuran; trichloroethane; and a combination thereof, but are not limited thereto. Such a solvent may be used singularly or in a combination of two or more.

According to another embodiment, a film including the organosilicate compound and the polymer component is provided, optionally also including an additive, an inorganic material, or a combination thereof.

The polymer includes, but is not limited to, a polyimide, aramid, polyamide, polyurethane, and a combination thereof as described above.

The films may be formed by a variety of methods, for example by coating, (e.g., spin coating, flow coating, dip coating, doctor blade coating, brush coating, cup coating, and spray coating), by printing (e.g., microgravure, ink jet, reverse microgravure, comma, slot/die coating, lip coating), and the like. The films may be formed on a substrate or a release layer, depending on the intended use of the film. The thickness of the film is not particularly limited, and can be, for example, 1 micrometer to 5 millimeter, more specifically a thickness of 5 micrometer to 2 millimeter.

Films including an organosilicate compound of Chemical Formula 1 may exhibit one or more improved characteristics, such as a low coefficient of thermal expansion, improved light transmittance and/or improved yellow index. The film may, for example, exhibit a coefficient of thermal expansion (CTE) from about 10 ppm/° C. to about 50 ppm/° C., more specifically about 10 ppm/° C. to about 30 ppm/° C., a yellow index of about 2.0 to about 7.0, more specifically about 2.0 to about 5.0, and/or a light transmittance from about 80% to about 94%, more specifically about 88% to about 94%.

A film may be formed, disposed on, or applied to a substrate for a device, be part of an integrated circuit (IC) or a multi-layer flexible printed circuit (FPC), or may be used as an optical film, an adhesive, or a tape.

Hereinafter, the embodiments are illustrated in more detail with reference to examples. However, the following are exemplary embodiments and are not limiting.

EXAMPLE 1

Preparation of Representative Organosilicate Compound 200 mg of aminopropyl(trimethoxy)silane ("APTMS"), 520 mg of bis(triethoxysilyl)ethane ("BTSE"), and 400 mg of H$_2$O are agitated in a 500 mL round-bottomed flask in the presence of 70 wt % dimethyl acetamide ("DMAc") for 10 minutes at 0° C. and for 5 hours at 65° C. to prepare a representative organosilicate compound.

EXAMPLE 2

Preparation of Representative Organosilicate Compound 100 mg of APTMS, 520 mg of BTSE, 100 mg of methyl (trimethoxysilane) ("MTMS"), and 400 mg of H$_2$O are agitated in a 500 mL round-bottomed flask in the presence of 70 weight percent DMAc for 10 minutes at 0° C. and for 5 hours at 65° C. to prepare a representative organosilicate compound.

EXAMPLES 3 TO 5

Preparation of a Representative Composition for Use in Fabricating Film

The organosilicate compound according to Example 2 and polyamic acid dissolved in DMAc are mixed for 30 minutes at room temperature to prepare a composition. In Examples 3, 4 and 5, the amount of organosilicate compound is 1 wt %, 2 wt %, and 5 wt %, respectively, relative to the total weight of the composition.

EXAMPLES 6 TO 8

Fabrication of Film

The compositions produced according to Examples 3 to 5 are respectively cast onto glass substrates pre-treated with octyltrichlorosilane to form a coating about 100 μm thick. Following application, the coated substrates undergo N$_2$ purging at about 50° C. for about 1 hour, and are allowed to stand under vacuum at about 80° C. for about 1 hour, after which time the temperature is increased to about 250° C. at a rate of about 1° C. per minute. Subsequently, heat treatment at 250° C. is performed under a nitrogen (N$_2$) atmosphere for about 1 hour to thereby fabricate the films including a polyimide/organosilicate compound. In the films of Examples 6, 7 and 8, the amount of organosilicate compound included in compositions used to prepare the films is 1 wt %, 2 wt %, and 5 wt %, respectively.

COMPARATIVE EXAMPLE 1

Fabrication of Film

A polyamic acid solution is prepared by reacting 3,3',4,4'-benzophenonetetracarboxylic dianhydride ("BTDA") and bis[4-(3-aminophenoxy)phenyl]sulfone ("m-BAPS") in a 1:1 mole ratio. The solution is applied onto a glass substrate that was not pre-treated with octyltrichlorosilane to form a film about 80 μm thick. Following application, the coated substrate undergoes N$_2$ purging at about 50° C. for about 1 hour, and is allowed to stand under vacuum at about 80° C. for about 1 hour, after which time the temperature thereof is increased to about 250° C. at a rate of about 1° C. per minute. Subsequently, heat treatment at 250° C. is performed under a nitrogen (N$_2$) atmosphere for about 1 hour to thereby fabricate a comparative polyimide film.

Measurement of Molecular Weight (Mn)

The structure and molecular weight of the organosilicate compound according to Example 2 are analyzed using Matrix-assisted laser desorption and ionization-time-of-flight ("MALDI-TOF") mass spectroscopy and Gel Permeation Chromatography ("GPC"). The MALDI-TOF mass spectroscopy analysis result is shown in FIG. 1. As shown in FIG. 1, the MALDI data indicate that the compound has a structure where 2 or 3 cages or partial cages are linked, and the GPC show that the compound has a number average molecular weight of 25,000 (PDI=2.0).

Infrared Spectrophotometric Analysis

Figure 2:
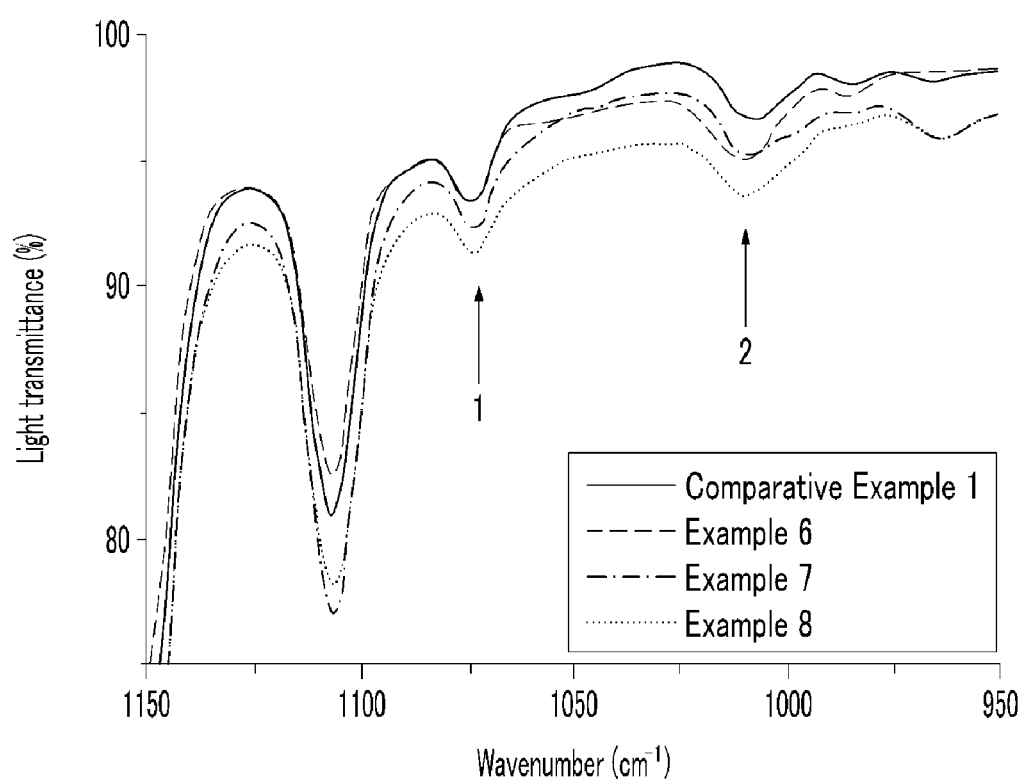
FIG. 2 is a spectrum illustrating the results of Fourier transform infrared spectroscopy analysis of the representative films of Examples 6 to 8 and a polyimide film of Comparative Example 1.

FIG. 2 shows a structural analysis result of films of Examples 6 to 8 obtained by using Fourier transform infrared spectrophotometry ("FT-IR"). As shown in FIG. 2, the Si—O—Si stretching peak (peak 1) and Si—CH$_3$ wagging peak (peak 2) increase at about 1070 cm$^{-1}$ and 1020 cm$^{-1}$ according to the content of an organosilicate compound.

Thermal Property

Figure 3:
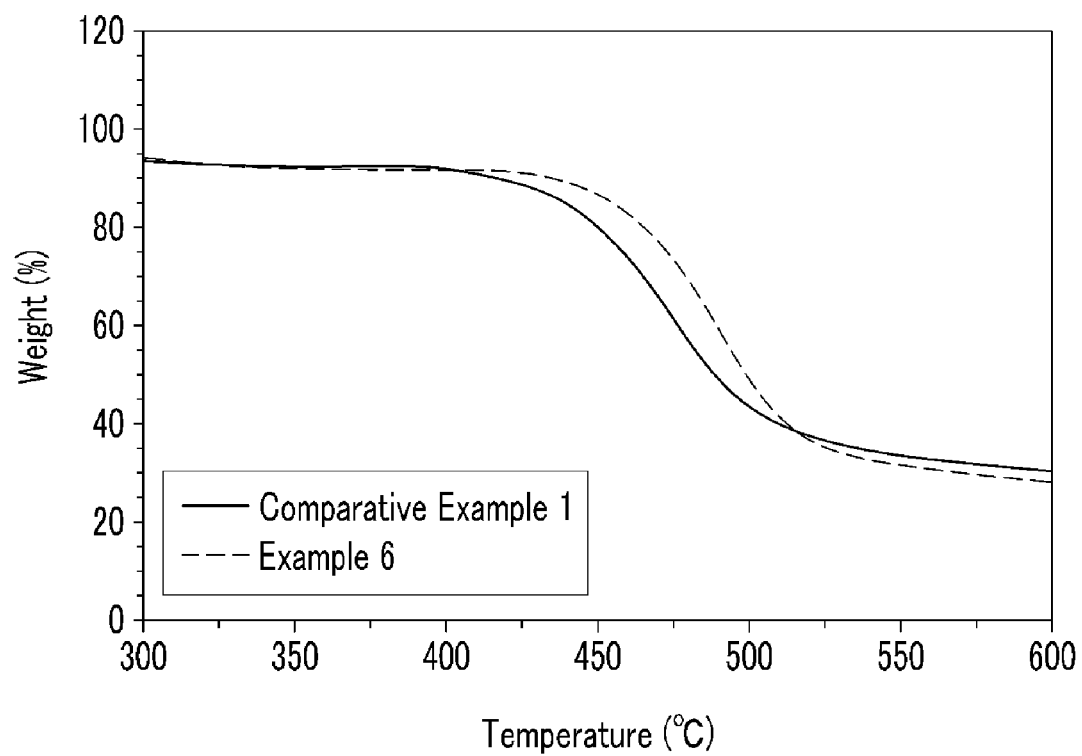
FIG. 3 is a graph of weight percent vs. temperature (° C.), illustrating the results of a thermogravimetric analysis ("TGA") of the representative film of Example 6 and a polyimide film of Comparative Example 1.

FIG. 3 shows the results of a thermogravimetric analysis ("TGA") of the film of Example 6, prepared from a composition that includes a representative organosilicate compound in an amount of 1 wt %, under the conditions of 10° C./min, 600° C., N$_2$: 35 mL/min, using Universal V4.5A TA instruments. As shown in FIG. 3, the decomposition temperature is increased by about 30° C., as compared to a polyimide film prepared without the organosilicate compound (Comparative Example 1).

Figure 4:
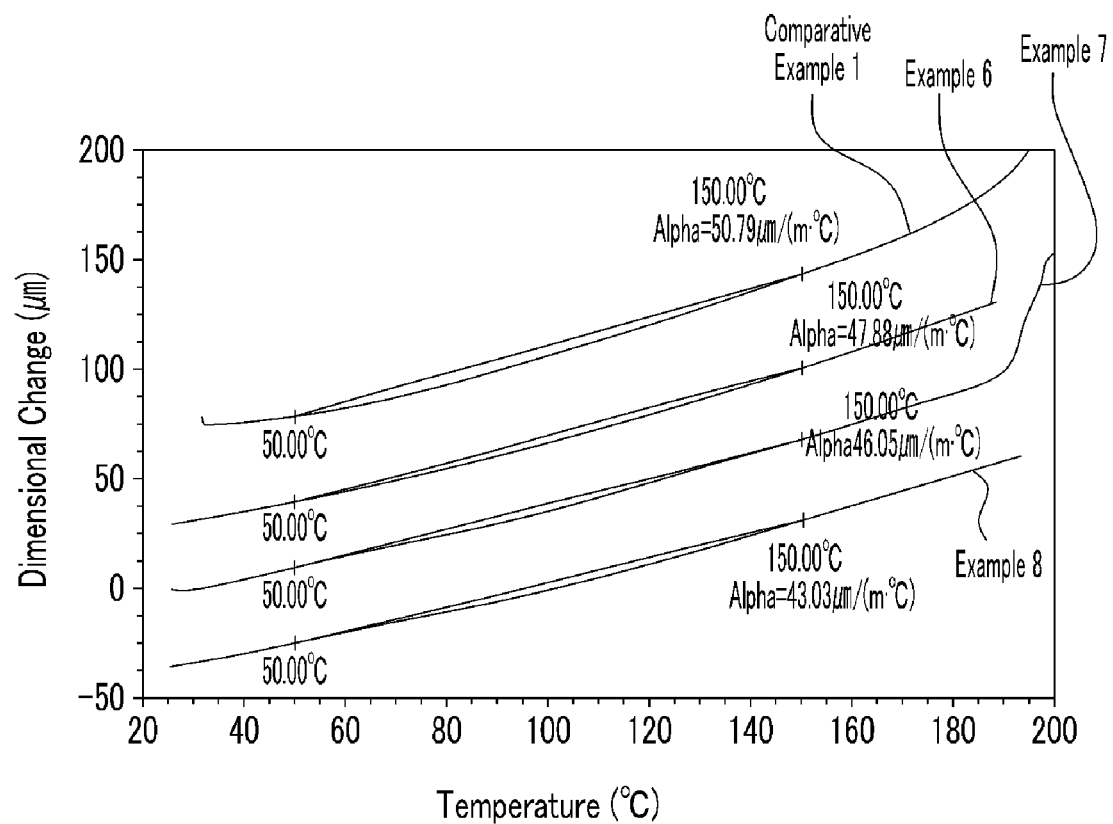
FIG. 4 is a graph of dimensional change (μm) vs. temperature (° C.), illustrating the coefficients of thermal expansion ("CTE") of the representative films of Examples 6 to 8 and a polyimide film of Comparative Example 1.

FIG. 4 illustrates the coefficient of thermal expansion ("CTE") of the films described in Comparative Example 1 and Examples 6 to 8. As shown in FIG. 4, as the content of an organosilicate compound increases, the CTE decreases. The coefficient of thermal expansions of the films fabricated according to Examples 6, 7 and 8, which include a representative organosilicate compound in amounts of about 1 wt %, 2 wt % and 5 wt %, respectively, are about 47.88 ppm/° C., about 46.05 ppm/° C. and about 43.03 ppm/° C. These values show a significant decrease, when compared to the coefficient of thermal expansion of Comparative Example 1 (about 50.79 ppm/° C.).

Optical Properties

To evaluate the optical properties of the films fabricated according to Examples 6 to 8 and Comparative Example 1, light transmittance and yellow index ("YI") are measured with a KONICA MINOLTA Spectrophotometer. The measurement results are shown in the following Table 1.

TABLE 1

| | Light transmittance (%) | Yellow index (YI) |
|---|---|---|
| Comparative Example 1 | 86 | 7.7 |
| Example 6 | 94 | 3.2 |
| Example 7 | 94 | 3.6 |
| Example 8 | 91 | 3.5 |

As shown in Table 1, the films of Examples 6 to 8 including the organosilicate compound show an improvement in light transmittance and yellow index, compared with the polyimide film fabricated according to Comparative Example 1 that does not include the organosilicate compound.

Mechanical Properties

Figure 5:
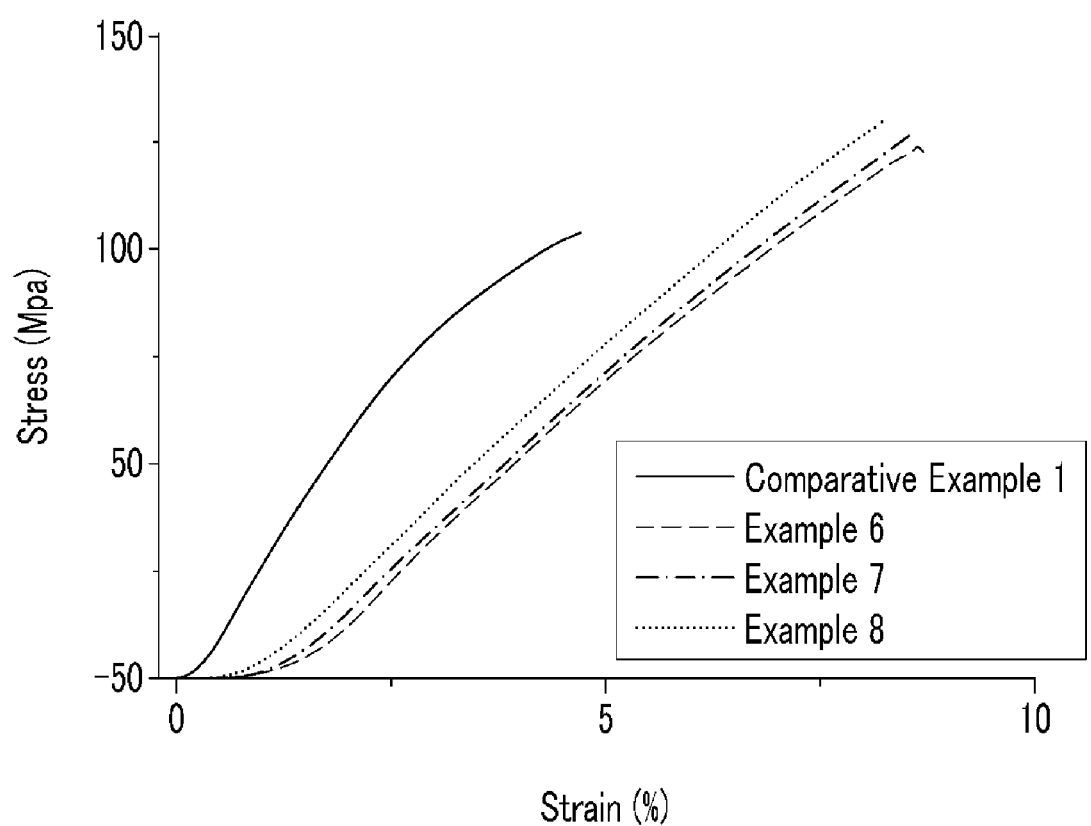
FIG. 5 is a graph of stress (MPa) vs. strain (%), illustrating the results of a strain measurement analysis for the representative films of Examples 6 to 8 and a polyimide film of Comparative Example 1.

FIG. 5 shows the results of strain measurement analysis of the films of Examples 6 to 8 and the polyimide film of Comparative Example 1 using a universal testing machine ("UTM"), produced by SHIMADZU Company. As shown in FIG. 5, the polyimide film shows strain of less than about 5%, while the films of Examples 6 to 8 show strains of about double that value. In addition, the ultimate strengths of the films of Examples 6 to 8 are increased, compared with the polyimide film. These results indicate that the polyimide film that includes an organosilicate compound as provided herein is more flexible and has toughness and elongation characteristics.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An organosilicate compound represented by the following Chemical Formula 1:

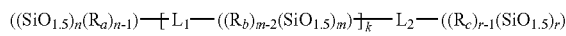

Chemical Formula 1 wherein in the above Chemical Formula 1, n, each m, and r are the same or different, and independently about 4 to about 12, k is an integer from 0 to about 10, each $L_1$ and $L_2$ is a linker and is a C1 to C30 alkylene group, a C3 to C30 cycloalkylene group, a C6 to C30 arylene group, a C2 to C30 alkenylene group, or a C2 to C30 alkynylene group, and each $R_a$, $R_b$, and $R_c$ are the same or different, and are independently hydrogen, a C1 to C15 alkyl group, a C3 to C15 cycloalkyl group, a C6 to C15 aryl group, C2 to C15 alkenyl group, a C2 to C15 alkynyl group, C1 to C15 alkyleneamine group, a C6 to C15 aryleneamine group, or a C2 to C15 alkenyleneamine group, wherein at least one or $R_a$, $R_b$ or $R_c$ comprises an amine functional group.

2. The organosilicate compound of claim 1, wherein the organosilicate compound comprises about 5 to about 50 mol % of the amine functional group, based on the moles of silicon-containing groups in the organosilicate compound.

3. The organosilicate compound of claim 1, wherein the organosilicate compound of Chemical Formula 1 is a polymer having a number average molecular weight of about 500 to about 100,000.

4. The organosilicate compound of claim 1, wherein the organosilicate compound of Chemical Formula 1 is a polymer having a polydispersity index (Mw/Mn) of about 1 to about 2.

5. The organosilicate compound of claim 1, wherein the organosilicate compound of the above Chemical Formula 1 is prepared by reacting at least one silane compound of the following Chemical Formula 3 with at least one silane compound of the following Chemical Formula 4:

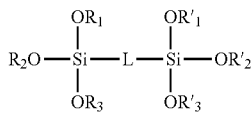

Chemical Formula 3 wherein in the above Chemical Formula 3, $R_1$, $R_2$, $R_3$, $R'_1$, $R'_2$ and $R'_3$ are the same or different, and are independently a C1 to C15 alkyl group, a C3 to C15 cycloalkyl group, a C6 to C15 aryl group, a C2 to C15 alkenyl group, or a C2 to C15 alkenyl group, and L is the same as $L_1$ and $L_2$ in Chemical Formula 1,

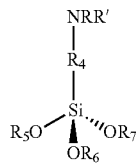

Chemical Formula 4 wherein in the above Chemical Formula 4, $R_4$ is a linker and is a C1 to C30 alkylene group, a C3 to C30 cycloalkylene group, C6 to C30 arylene group, a C2 to C30 alkenylene group, or a C2 to C30 alkynylene group, R and R' are the same or different, and are independently hydrogen or a C1 to C15 alkyl group, and $R_5$, $R_6$, and $R_7$ are the same or different, and are independently hydrogen, a C1 to C15 alkyl group, a C3 to C15 cycloalkyl group, C6 to C15 aryl group, a C2 to C15 alkenyl group, or a C2 to C15 alkynyl group.

6. The organosilicate compound of claim 5, wherein the silane compound of the above Chemical Formula 3 is included in an amount of about 0.1 wt % to about 99.9 wt %, and the silane compound of the above Chemical Formula 4 is included in an amount of about 99.9 wt % to about 0.1 wt %.

7. The organosilicate compound of claim 1, wherein the organosilicate compound of above Chemical Formula 1 is obtained by additionally adding a silane compound of the following Chemical Formula 5 to the silane compounds of the above Chemical Formulae 3 and 4:

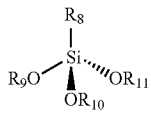

Chemical Formula 5 wherein in the above Chemical Formula 5, $R_8$ is hydrogen, a C1 to C15 alkyl group, a C3 to C15 cycloalkyl group, a C3 to C15 cycloalkyloxy group, a C6 to C15 aryl group, a C2 to C15 alkenyl group, or a C2 to C15 alkynyl group, and $R_9$, $R_{10}$, and $R_{11}$ are the same or different, and are independently hydrogen, a C1 to C15 alkyl group, a C3 to C15 cycloalkyl group, a C6 to C15 aryl group, a C2 to C15 alkenyl group, or a C2 to C15 alkynyl group.

8. The organosilicate compound of claim 7, wherein the silane compound of the above Chemical Formula 5 is included in an amount from about 0.1 to about 100 parts by weight based on 100 parts by weight of the silane compound of Chemical Formula 3.

9. A composition comprising the organosilicate compound according to claim 1 and a polymer.

10. The composition of claim 9, wherein the polymer comprises polyamic acid, polyimide, aramide, polyamide, polyurethane, or a combination thereof.

11. The composition of claim 9, wherein the organosilicate compound is included in an amount of about 0.1 wt % to about 50 wt % and the polymer is included in an amount of about 50 wt % to about 99.9 wt %.

12. A film comprising the organosilicate compound according to claim 1 and a polymer.

13. The film of claim 12, wherein the polymer comprises polyamic acid, polyimide, aramid, polyamide, polyurethane, or a combination thereof.

14. The film of claim 12, wherein the organosilicate compound is included in an amount of about 0.1 wt % to about 50 wt % and the polymer is included in an amount of about 50 wt % to about 99.9 wt %.

15. The film of claim 12, wherein the film has a coefficient of thermal expansion of about 10 ppm/° C. to about 50 ppm/° C.

16. The film of claim 12, wherein the film has a yellow index of about 2.0 to about 7.0.

17. The film of claim 12, wherein the film has light transmittance of about 80% to about 94%.

* * * * *